UNITED STATES PATENT OFFICE.

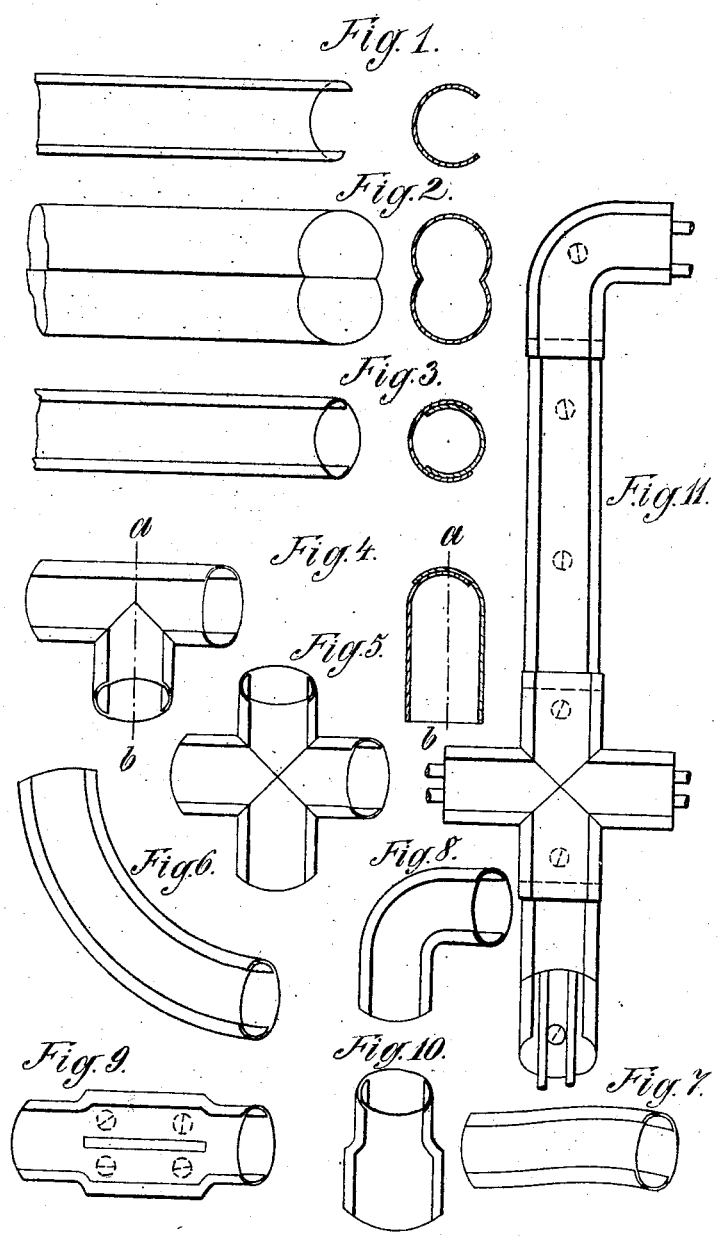

RICHARD HENRY WHITE KNIGHT AND LUDWIG NAGEL, OF LONDON, ENGLAND.

CONDUIT OR CASING FOR ELECTRICAL CONDUCTORS.

No. 814,217.  Specification of Letters Patent.  Patented March 6, 1906.

Application filed March 1, 1904. Serial No. 196,985.

*To all whom it may concern:*

Be it known that we, RICHARD HENRY WHITE KNIGHT, engineer, residing at 108 Ardgowan road, London, S. E., and LUDWIG NAGEL, electrician and general engineer, residing at 7 Tredegar Square, Bow, London, E., England, have invented new and useful Improvements in Conduits or Casings for Electrical Conductors, of which the following is a specification.

Our invention relates to improvements in conduits or casings for electric conductors for all kinds of wiring in general—such as houses, shops, premises, and the like, as well as for underground power and electric-light conductors; and its particular objects are (a) to provide for easy access to wires and cables for inspection, repairs, or exchange of wires; (b) to guarantee in a corresponding degree more efficiency in insulating and immunity from fire to buildings and the like; (c) to simplify wiring; (d) to effect considerable economy of labor both in installation and maintenance, as with our tube-conduits and branch pieces any defect in wires or joints may be immediately located. These objects are attained by means of the devices illustrated in the accompanying drawings, in which—

Figure 1 is a section of over-half-circle open tube; Fig. 2, two sections placed in position; Fig. 3, closed circular-tube conduit; Fig. 4, closed circular tube T-piece with section through a b; Fig. 5, closed circular-tube cross-piece; Fig. 6, closed circular-tube bend-piece; Fig. 7, closed circular-tube spring-piece; Fig. 8, closed circular-tube round-elbow piece; Fig. 9, closed circular-tube fuse-box; Fig. 10, closed circular-tube diminisher; Fig. 11, a plan showing branch pieces and conduits carrying wires.

We propose constructing our circular-tube conduit and tube branch pieces as follows: We take strips of suitable gage sheet-steel, hard bronze, brass, fiber compound, or any other suitable elastic material, shape them into two or more over-half-circle open tubes, Fig. 1, each open tube measuring the same diameter inside and outside. We place the two or more over-half-circle open tubes directly opposite each other, Fig. 2, and by using pressure on top and bottom open tubes they form a complete closed-spring lap-jointed circular-tube conduit, Fig. 3. We purpose constructing our tube branch-off and angle pieces—such as T's, Fig. 4, crosses, Fig. 5, bends, Fig. 6, springs, Fig. 7, round elbows, Fig. 8, also fuse-boxes, Fig. 9, and diminishing sockets, Fig. 10—upon the same spring lap-jointed circular-tube principle, as follows: We take sheet-steel, hard bronze, brass, fiber compound, or any other suitable elastic material, stamp and shape the particular design of branch-off piece required into over-half-circle open-tube parts. We take two open-tube branch-off pieces of the same design and place the open over-half-circle pieces directly opposite each other, and by using pressure on top and bottom pieces they form a complete closed spring lap-jointed circular-tube branch-off piece.

We purpose insulating our tube-conduits and branch-off pieces as follows: We take the metallic open-tube sections of our tube and branch-off pieces and emerge them slightly heated into a bath of paint, enamel, pitch, bitumen, or rosin compound, after which we allow the sections to cool or set.

We purpose fixing our tube and branch-off pieces as follows: We commence by taking one section of open tube and nail or screw to walls, woodwork, or the like, adding oval washers to the nails or screws from inside of tube-sections and continuing by lapping each section one in the other at joints until the bottom sections of tube and branch-off pieces are complete, after which we lap and spring over top sections, care being taken that top sections are so arranged that each length passes and finishes beyond the bottom tube-section joint.

Having now particularly described and ascertained the nature of our said invention and in what manner the same is to be performed, we declare that what we claim is—

1. A tube consisting of two parts of elastic material of channel form of more than semicircular cross-section, one part fitting in the other.

2. A tube having portions at angle to each other, said portions being made up of two parts of elastic material of channel form of more than semicircular cross-section, one part fitting in the other, substantially as described.

In witness whereof we have hereunto set our hands in presence of two witnesses.

RICHARD HENRY WHITE KNIGHT.
LUDWIG NAGEL.

Witnesses:
H. D. JAMESON,
A. NULTEY.